Aug. 20, 1957

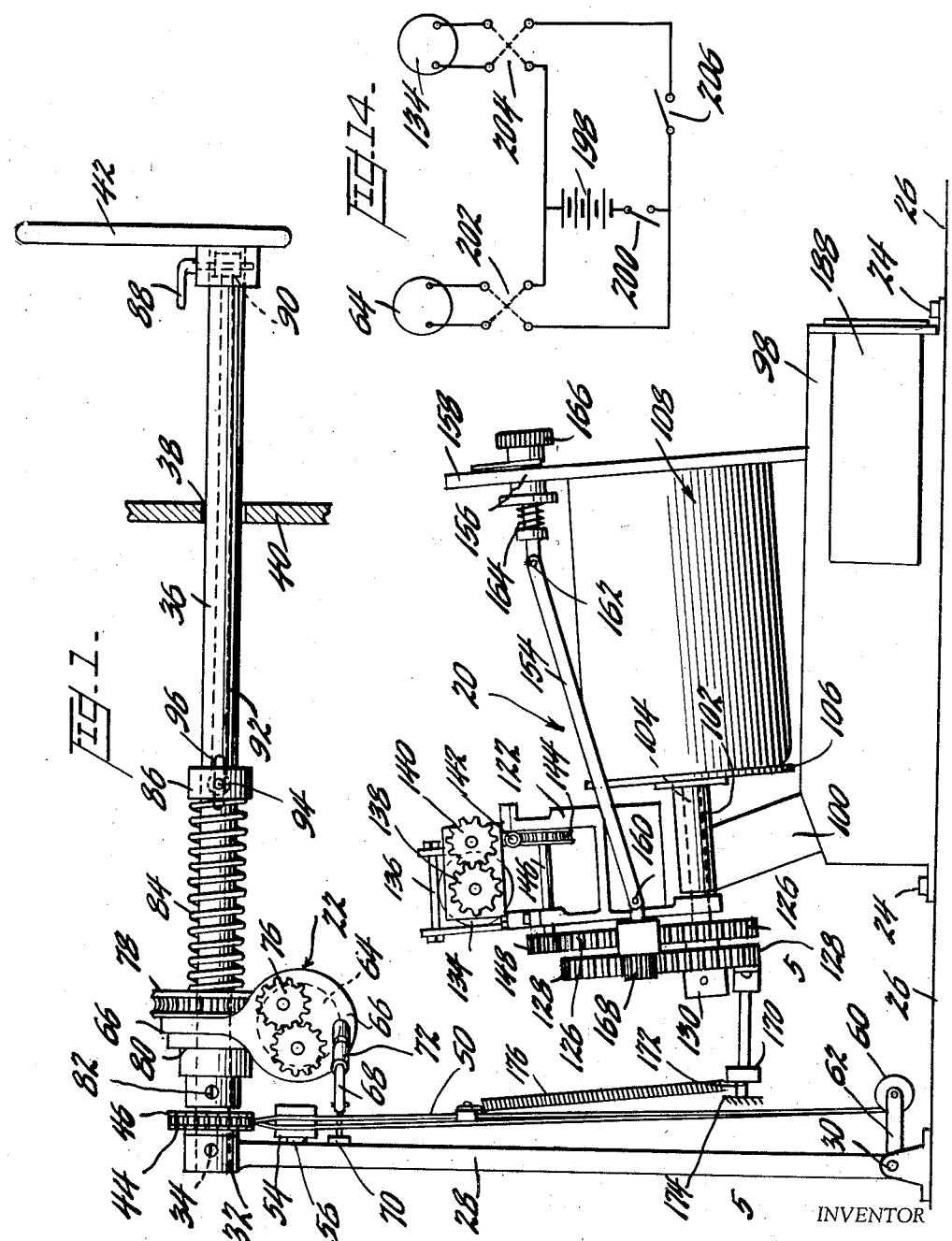

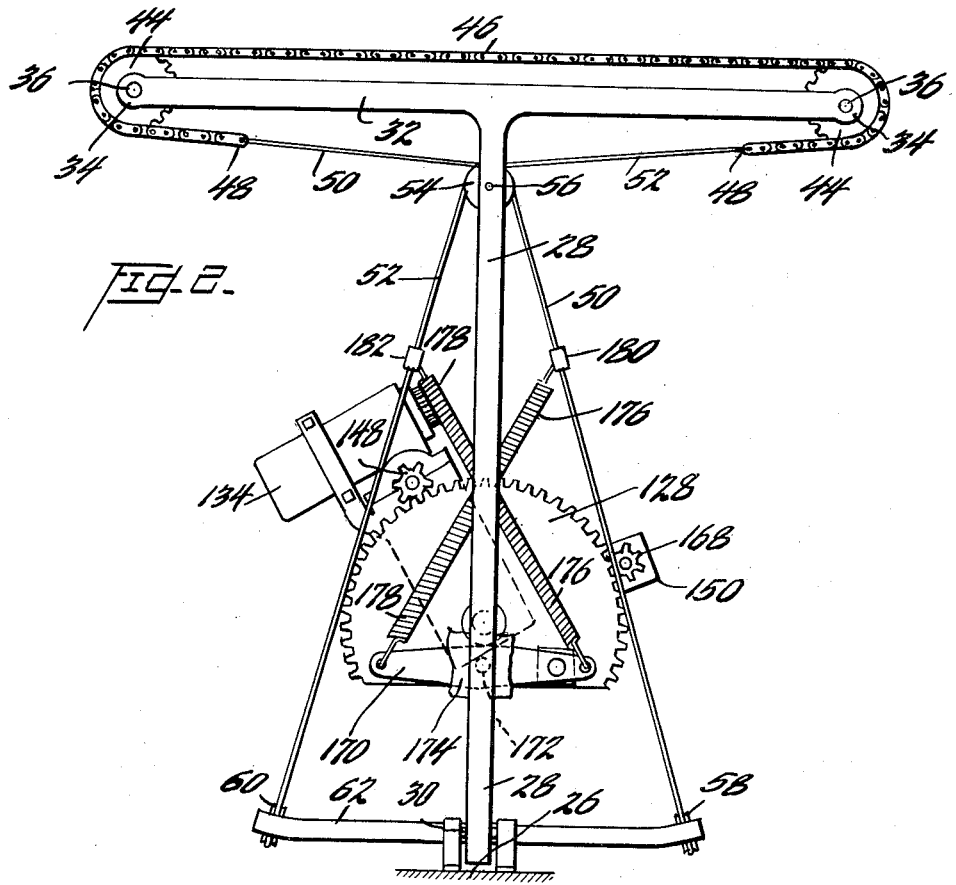
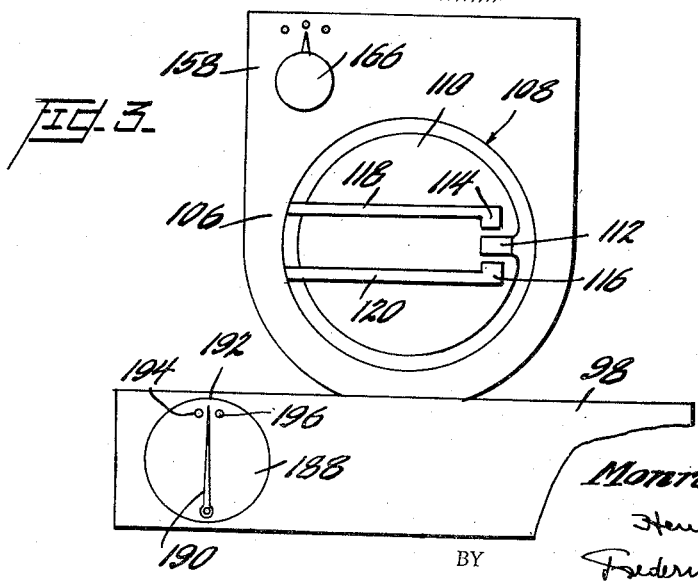

M. H. SWEET 2,803,794

AUTOMATIC PILOT

Filed Dec. 26, 1952

INVENTOR

M.H. Sweet,

BY

ATTORNEYS

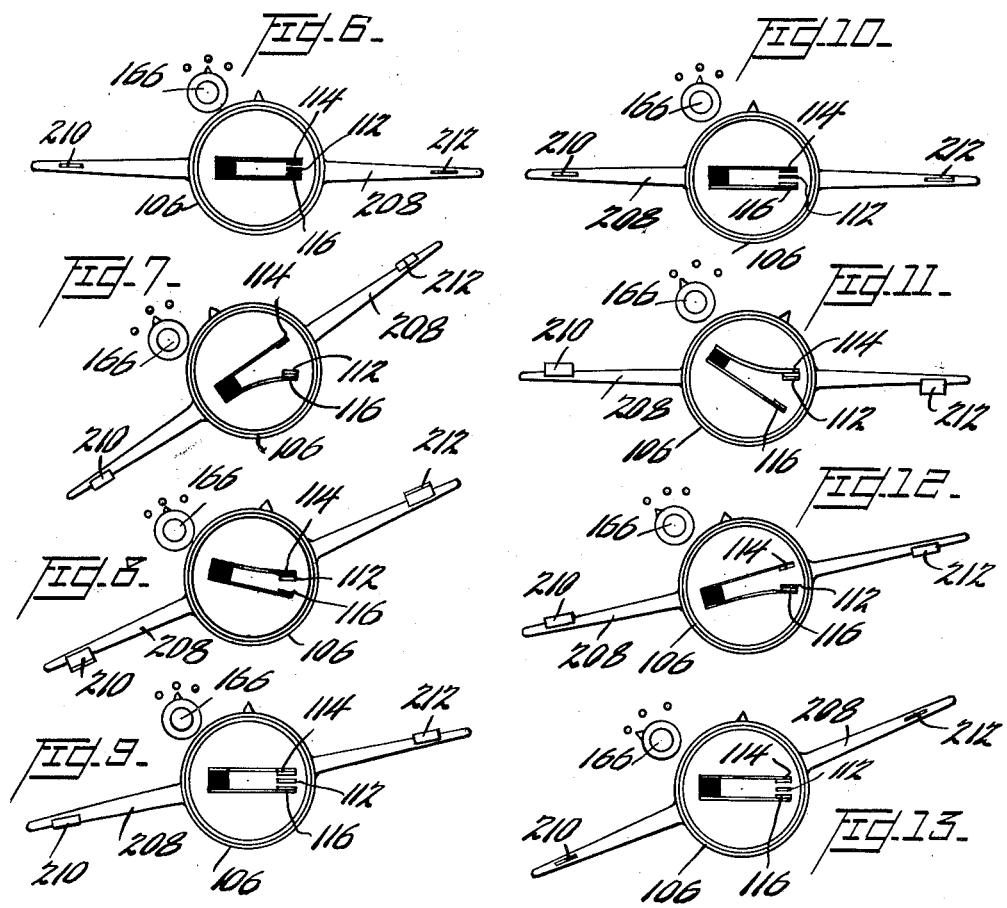
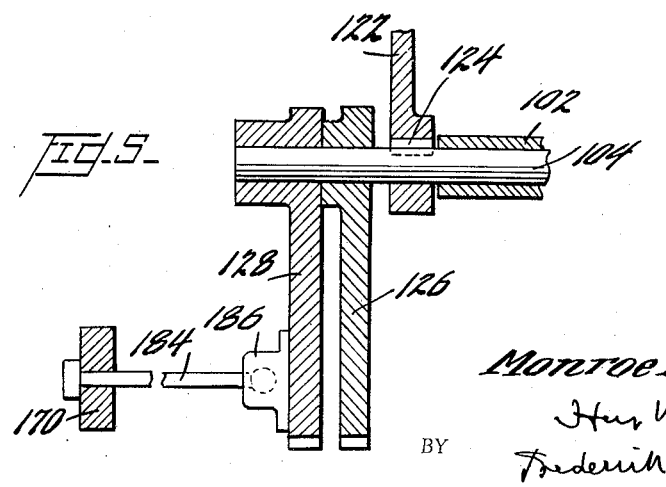

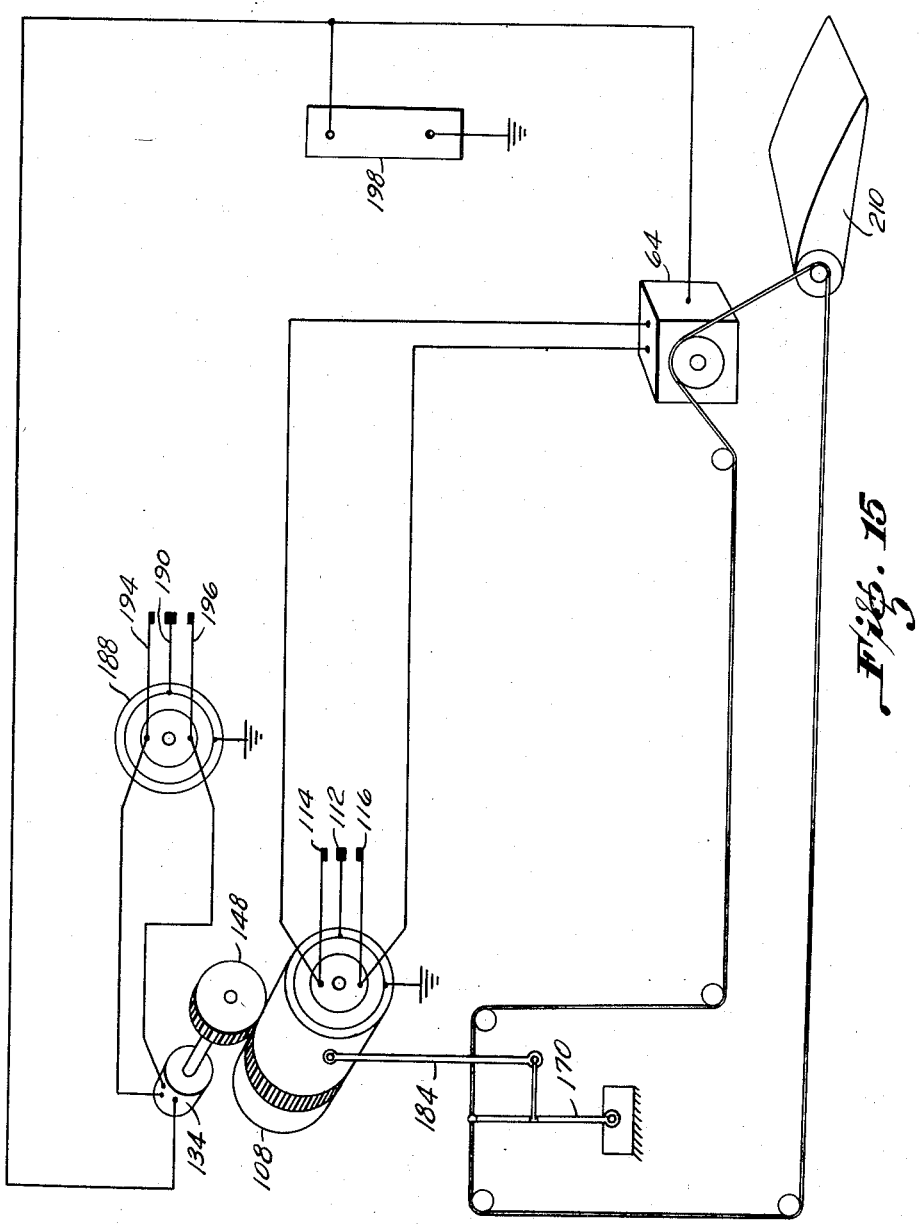

United States Patent Office 2,803,794
Patented Aug. 20, 1957

2,803,794
AUTOMATIC PILOT

Monroe H. Sweet, Binghamton, N. Y., assignor to General Aniline & Film Corporation, New York, N. Y., a corporation of Delaware Application December 26, 1952, Serial No. 328,042

6 Claims. (Cl. 318—489)

This invention relates generally to control of aircraft and more particularly an automatic pilot possessing features which render it especially adaptable for installation and use in the modern, so-called, "light-plane."

In order that the principles of the present invention be more clearly understood, the following description will refer briefly to a few of the basic concepts involved.

An aircraft in flight, like any other free body in space, is subject to the universal laws of motion. Thus, when an aircraft is flying at a constant altitude and heading, all of the forces acting upon it are in balance and it will, therefore, tend to maintain a constant flight-path unless and until some disturbing force is applied.

In conventional aircraft, the flight path is changed by means which control the wing to give it an angle of bank away from horizontal. These generally comprise a pair of differentially movable ailerons pivotally mounted in the trailing edge of each wing adjacent its outer portion. It will be apparent that as long as the wings are held in a banked condition, the horizontal component of the total lift acting upon the wings will continue to pull the aircraft around in a turn or, in other words, will continually change the heading of the aircraft. In the same manner, in order to produce the initial bank of the wings, it is only necessary that the ailerons be displaced from neutral position for a sufficient length of time to permit the wings to reach such banked attitude at which time the ailerons must be returned substantially to neutral position in order to prevent the wings from continuing to increase the angle of bank. In other words, the aileron controls are only held out of neutral position long enough to permit the wings to become banked after which they are returned to neutral and, after the desired turn has been completed, the control must then be moved away from neutral in a reverse direction in order to initiate a return of the wings to horizontal position. The aileron controls, therefore, are not held in a displaced position during the entire time it is desired to turn the aircraft.

Airplanes are not inherently stable about their longitudinal axis. This condition of instability is called "spiral instability" since any conventional aircraft will, in air of normal turbulence, develop a spiral dive if not prevented from doing so by the pilot.

It is a principal object of the present invention to provide an automatic control mechanism for an aircraft or the like which is capable of overcoming the natural instability of the aircraft in response to movements about its longitudinal or banking axis.

In its broader aspects, the invention comprises an automatic flight control system for aircraft having wing elements which may be positioned by control means to effect roll axis displacement and includes a sensing device which is operatively responsive to the magnitude and direction of such displacement, and means responsive upon operation of this sensing device to actuate the control means in such direction as to correctively position the wing elements thereby to counteract roll axis displacement; means being also provided to reduce the effective operative response of the sensing device simultaneously with the actuation of the control means so as to prevent oscillation about the roll axis. Furthermore, use is made of a yaw axis displacement sensing device by superimposing the operative response thereof upon the control utilized to effect wing element displacement.

It is a particular feature of the invention that the autopilot, in accordance therewith, employs the conventional gyro-horizon used in the aircraft with certain modifications for the detection and correction of displacements about the longitudinal axis together with the similarly modified rate of turn indicator of the plane for detecting relatively slight changes in heading and for trimming operation of the control system in order to maintain a constant heading.

It is a salient feature of the invention that the aircraft autopilot, in accordance therewith, employs a novel form of mechanical follow-up or feed-back linkage for automatically preventing overcorrection.

Other objects and features will be apparent from the following description of the invention, pointed out in particularity in the appended claims, and taken in connection with the accompanying drawings, in which:

Figure 1 is a partially diagrammatic side elevational view of a preferred form of the autopilot in accordance with the present invention showing the components mounted in a conventional airplane cockpit;

Figure 2 is an end elevational view taken from the left side in Figure 1;

Figure 3 is an end elevational view of the control unit illustrated in the lower portion of Figure 1 and taken from the right side in Figure 1;

Figure 4 is an exploded perspective view illustrating a position of the control unit of Figure 1;

Figure 5 is a fragmentary cross-sectional view taken along the line of 5—5 of Figure 1 and illustrating a portion of the feed-back linkage;

Figures 6 to 13, inclusive, are schematic views illustrating in sequence the relative positions of the electrical contacts of the gyro-horizon, the ailerons, and the return control knob at different times during operation of the autopilot; and Figure 14 is a simplified diagrammatic illustration of an electrical circuit suitable for use in the preferred embodiment of autopilot.

Figure 15 is a schematic representation of the electrical control system showing the interaction of the elements and the electrical circuit.

Referring now in greater detail to the drawings and in particular to Figure 1 thereof, the preferred form of autopilot in accordance with the present invention is seen to comprise a control unit designated generally by the reference numeral 20 and a power unit for actuating the aircraft control system designated generally by the reference numeral 22. The control unit 20 may be mounted in any convenient location in the aircraft and as shown by way of example in Figure 1 it is attached by means of bolts or the like 24 to the aircraft floor 26 within the usual airplane cockpit.

A conventional airplane control system for the normal manual control of the airplane is partially illustrated in Figures 1 and 2 in generally diagrammatic form and comprises a yoke 28 pivotally mounted as at 30 on some fixed portion of the aircraft structure such as the flooring 26. At its upper end the yoke 28 is formed with a crossbar 32 which is integral with the yoke 28 and moves therewith as the latter is oscillated in a generally vertical plane about the pivot 30. As shown particularly in Figure 2, the crossbar 32 is provided at its opposite ends with bearings 34 in each of which is rotatably mounted in any convenient manner a control shaft 36. It will be understood that duplicate control shafts 36 are provided for the sole purpose of furnishing dual controls as is customary in most conventional aircraft, and that the auto-pilot in accordance with the present invention can also be applied to a single control system utilizing either a "stick" or "throwover" wheel type of control.

The control shafts 36 extend in a generally horizontal plane rearwardly or to the right in Figure 1, passing through suitable apertures 38 provided in the usual airplane instrument panel 40, a fragment of which is illustrated in Figure 1. Each control shaft 36 is provided with a wheel 42 which may be of any desired shape or configuration. At their opposite or forward ends each shaft 36 is provided with a sprocket wheel 44. The control wheels 42 and sprocket wheels 44 are rigidly connected to their respective control shafts 36 so that manual rotation of either control wheel 42 will produce a corresponding rotation of its associated sprocket wheel 44 in the usual manner. It will also be apparent that movement of either control wheel 42 in a horizontal sense will produce oscillation of the yoke 28 about the pivot 30.

Referring particularly to Figure 2, it will be noted that the sprocket wheels 44 at the opposite ends of the cross bar 32 are operatively connected together for joint rotational movement by means of a sprocket chain 46 which extends over both sprocket wheels 44 in driving engagement therewith. The ends 48 of the chain 46 are in turn connected to the ends of control cables 50 and 52 which pass over a double pulley 54 pivotally mounted on the yoke 28 as at 56, and thence extend downwardly to individual pulleys 58 and 60 respectively. The pulleys 58 and 60 are rotatably mounted at the opposite ends of a transverse bracket 62 formed at the lower end of the yoke 28 and preferably as close as possible to the pivot 30. From the pulleys 58 and 60 the control cables 50 and 52 extend to the conventional ailerons or equivalent control surfaces of the aircraft. It will now be apparent that rotation of the control wheel 42, which in turn causes rotation of the sprocket wheels 44, will result in simultaneous opposite movement of the control cables 50 and 52 thereby imparting differential movement to the ailerons.

The description, thus far, centered around a typical aircraft control where the ailerons are differentially actuated in order to execute a banked turn. It should also be understood that the rudder of the craft may be interconnected with the aileron control mechanism so as to make a coordinated turn. The automatic pilot, in accordance with this invention, is particularly suitable for the above type of control and may be easily installed in various types of aircraft having such flight control equipment.

Two flight indicating instruments form the nucleus of the present autopilot, namely, the gyro horizon and the turn indicator gyro. In modern, small aircraft these instruments are generally standard equipment in which case both, modified in accordance with the invention, may be retained and will serve as the sensing and control instruments for the automatic piloting of the craft. If these instruments are not originally part of the aircraft then they become part of the autopilot assembly and installation.

To simplify the description of the invention, and the understanding thereof, both the gyro horizon and the turn indicator are shown as component elements of the automatic pilot. Obviously, these instruments, in their modified form, may simply replace such standard instruments of the craft, in which case their location in the craft may be retained and will be different than shown here merely for convenience of illustration and description.

Referring again to Figure 1 the power means for actuating the aileron control system comprises a reversible electric motor 64 which is carried by a frame 66 mounted for free rotational movement upon the control shaft 36. The frame 66, either directly or through the housing for the motor 64, is fixed against rotation about the control shaft 36 in any convenient manner as by means of a bracket 68 extending between the frame 66 and a suitable mounting point 70 on the yoke 28. In view of the relatively small amount of pivoting movement between the control shaft 36 and yoke 28 in a vertical plane, the bracket 68 is provided with a universal joint or equivalent lost motion mechanism 72 for the purpose of accommodating such slight pivoting movements. However, it is to be understood that the bracket 68 serves to prevent rotation of the actuator motor 64 about the control shaft 36 although the latter may freely rotate relative to the motor 64 within the frame 66.

The actuator motor 64 is provided with suitable reduction gearing indicated generally by numeral 76, preferably terminating in a worm gear (not shown) coaxial with the gear 76 and in engagement with a ring gear 78 loosely mounted upon the control shaft 36 for free rotation relative to the latter. In order to engage the gear 78 with the control shaft 36 for the purpose of driving the latter to impart control movements to the ailerons, there is provided a suitable clutch mechanism which as shown in Figure 1 comprises a clutch member 80 rigidly secured to the control shaft 36 as at 82 and having a portion extending through the frame 66 in frictional sliding engagement with the left hand face of the gear 78. A coil spring 84 surrounds the control shaft 36 at the right of the gear 78 in such manner that it may be compressed between the latter and a movable collar 86 mounted for sliding movement on the shaft 36. A control lever 88 on the shaft 36 is connected to a cam 90 located interiorly and in contact with a push rod 92 in the hollow portion of the shaft 36. At its forward end the push rod 92 is provided with a pin 94 which extends through the slot 96 cut in the shaft 36 and is secured to the sliding collar 86.

When the lever 88 is moved in one direction, the cam 90 pushing against the rod 92 will cause the collar 86 to compress the spring 84 against the gear 78 thereby engaging the clutch face of the latter with the corresponding clutch face of the element 80 so that the actuator motor 64 will impart rotation to the control shaft 36 and its associated control system. In like manner, when the lever 88 is moved in the opposite direction the clutch faces become disengaged so that the gear 78 is again freely rotatable relative to the shaft 36.

The apparatus for controlling the energizing of the motor 64 is illustrated in Figure 1, where it is designated generally by the numeral 20, and in Figure 4 where it appears in an exploded perspective view. Referring to these two figures, this apparatus designated as the control unit 20 includes as primary component elements the gyro horizon 108 and the turn indicator 188. The mounting of these units in the plane depends on constructional features and space requirements, and will vary. For the sake of illustration, however, the gyro-horizon 108 is shown here mounted on a base 98 provided with a bracket 100 having a bearing 102 formed at its upper end. Journalled within the bearing 102 and freely rotatable therein is a shaft 104 secured at one end to the end plate forming part of the housing 106 of the gyro-horizon 108.

The gyro-horizon sometimes referred to, as mentioned before, as an artificial horizon is a standard aircraft instrument which has been employed for many years in substantially all aircraft capable of flight under instrument conditions. Since the specific details of its construction, per se, form no part of the present invention they have not been illustrated in the drawings. In general, however, it may be said that the instrument comprises relatively movable gyroscopic and housing elements and is so constructed that, the gyroscopic elements remaining fixed in space, the position of the housing relative thereto will give an indication of the angle of bank of the aircraft within which the housing is mounted. For a further description covering the various constructional details of this device as well as the specific construction of the rate of turn indicator to be hereinafter referred to, reference may be had to a number of publications including War Department Technical Manual No. 1-413 published February 2, 1942, by the Superintendent of Documents, Washington, D. C., from who copies are available. Since instruments of this type may be either electrically or pneumatically operated substantially all such details have been eliminated from the present drawings for the sake of clarity.

In the normal utilization of a gyro-horizon, as mentioned above, the housing of the instrument is fixedly attached to some portion of the aircraft structure so as to be movable with the latter in order to indicate the angle of bank of the aircraft relative to a fixed line or artificial horizon carried by the gyroscopic element of the instrument which, when the instrument is in operation, remains relatively fixed in space. In the present case, however, the gyro-horizon 108 is rotatably mounted with respect to the aircraft structure since the shaft 104 which is rigidly secured to the housing 106 of the gyro-horizon and serves to mount the instrument within the aircraft, is itself rotatably mounted within the bearing 102. It will be apparent, therefore, that in addition to the fact that the housing 106 of the gyro-horizon may move relative to the fixed gyroscopic element in response to changes in angle of bank of the aircraft, the housing 106 of the gyro-horizon may also be moved independently relative to both the gyroscopic element and the aircraft structure by means of any rotational movement imparted to the shaft 104.

As shown in Figure 3 the relatively fixed gyroscopic element 110 carries an electrical contact 112 while the housing 106 carries a pair of electrical contacts 114 and 116 formed at the ends of a pair of spring-like elements 118 and 120 secured directly to the housing 106. In response to relative rotation between the gyroscopic element 110 and housing 106, the electrical contact 112 may move from a neutral position out of contact with either of the electrical contacts 114 or 116 into a position in contact with either one of the latter for a purpose and function which will hereinafter be more fully described.

Still referring to Figures 1 and 4, the shaft 104 extends through and considerably beyond the bearing 102. Immediately beyond the bearing 102, or to the left thereof in Figures 1 and 4, the shaft 104 is rigidly attached to a generally upwardly extending frame 122 as by means of a key 124. Beyond the frame 122 a first or inner gear segment 126 and a second or outer gear segment 128 are mounted by means of suitable bearings upon the shaft 104 and are freely rotatable thereon. The gear assembly may be held in place in any convenient manner as by means of a locking collar 130 secured to the end of the shaft 104 by means of a set screw 132.

At its upper end the frame 122 supports a reversible electric motor 134 which will be referred to hereinafter as the trim motor. The armature of the trim motor 134 is connected to a reduction gearing which comprises the gears 138 and 140, the worm gear 142, the gear 144 connected by means of a generally horizontal shaft 146 to a pinion gear 148. The pinion 148 is constantly in mesh with the first gear segment 126 and it is to be particularly noted that the reduction gearing 138—144 is of such a ratio as to provide frictional characteristics rendering it, for all practical purposes, irreversible. Thus, while the reversible trim motor 134 may be operated in either direction, the reduction gearing is so designed that rotation of the pinion 148 will not be effective to produce rotation of the armature of the motor 134.

At a convenient point on the periphery of the first gear segment 126 there is attached in any suitable manner a generally rectangular block 150 providing a bearing 152 therein. A shaft 154 is rotatably mounted within the bearing 152 and extends rearwardly to another bearing 156 formed in an end plate 158 constituting a portion of the housing of the gyro-horizon 108. The shaft 154 is rendered flexible by means of a pair of universal joints 160 and 162 and likewise includes a spring-pressed slip joint 164 permitting slight elongation and contraction of the shaft. At its extreme rearward end, the shaft 154 is provided with a manual control knob 166. At its extreme forward end, the shaft 154 carries a pinion 168 which is constantly in mesh with the second gear segment 128.

As indicated above, it is a salient feature of the present invention that a follow-up or feed-back linkage is provided between the aircraft flight control system and the autopilot control unit. This is of extreme practical importance to avoid excessive control action with its attendant hunting or overbanking. As shown in Figures 1, 2, 4 and 5, this negative feed-back coupling comprises a rocker arm 170 pivotally mounted at its center as at 172 on some convenient portion of the aircraft structure within the cockpit as indicated at 174 in Figure 1. At its opposite ends, the arm 170 is connected by means of a pair of crossed spring elements 176 and 178 to the downwardly extending portions of the aileron control cables 50 and 52 respectively. As shown in Figure 2, the springs 176 and 178 are connected to the respective control cables 50 and 52 by means of suitable clamps 180 and 182 which may be adjusted during installation of the autopilot in such manner as to substantially eliminate any unbalanced mechanical forces within the system. Near one of its ends the arm 170 is secured to a rod 184 which in turn is secured at its other end by means of a universal mounting 186 to the second gear segment 128. It will thus be apparent that whenever the aileron control system is displaced for any reason or by any means whatsover, a movement will be imparted to the second gear segment 128 by virtue of the mechanical linkage just described.

The trim motor 134 is under the control of the rate of turn indicator. This instrument is of standard construction, and since the specific constructional details thereof form no part of the present invention, it has not been illustrated in detail in the drawings. A complete description of such instruments may be found in various publications including the War Department Technical Manual No. 1-413 referred to hereinabove. For the purposes of the present disclosure it will suffice to state that the instrument comprises a gyroscopic element movably mounted within a case in such manner as to indicate by means of a movable pointer upon the face of a dial any tendency of the aircraft to turn away from any given heading. In addition the instrument indicates, by the position of the movable pointer, both the direction and the rate at which the aircraft is changing heading; but it should be noted that the indication is always that of rate of turn irrespective of the angle of bank. A rate of turn indicator is far more sensitive to changes in heading than is the conventional gyro-horizon to changes in angle of bank. This fact is utilized in the practice of the present invention by employing the rate of turn indication to "trim" the control impulse obtained from the gyro-horizon.

Referring to Figures 1 and 3, there is illustrated a conventional rate of turn indicator 188 having its housing or case rigidly mounted in any convenient manner in the base 98 of the control unit. The gyroscopic element of the rate of turn indicator 188 is connected in the usual manner to a pointer 190 which in the present case carries at its upper end an electrical contact 192 movable between a pair of electrical contacts 194 and 196 mounted upon the case or housing of the instrument. The function of the contacts 192—196 will become apparent from the description of the operation of the complete autopilot. For the present it will suffice to state that in response to any turning movement of the aircraft from a given heading the contact 192 will engage with either contact 194 or 196 in such manner as to energize the trim motor 134 in one direction or the other thereby initiating the application of a corrective control force to the aircraft control system.

In Figure 14 certain of the instrumentalities already referred to are illustrated in a very schematic circuit diagram. A single source of electrical power is shown as comprising a battery 198 connected through a master switch 200 for the operation of both the actuator motor 64 and the trim motor 134. The electrical contacts 112—116 which control the energizing of the actuator motor 64 have been illustrated as a simple reversing switch 202, while the contacts 192—196 controlling the energizing of the trim motor 134 have likewise been shown as a simple reversing switch 204. An additional switch 206 is shown in the circuit leading to the trim motor 134 which has not been previously described. This is preferably in the form of a microswitch connected to the turn control knob 166 in such manner as to break the electrical circuit to the trim motor 134 whenever the control knob 166 is moved from its neutral position. The function of the microswitch 206 will likewise become more apparent from the description of the operation of the complete autopilot which is set forth below.

Referring to Fig. 15, the interlinkage between the rate of turn indicator 188 with the gyro horizon 108 can be seen in simple form in that the motor 134, actuating the gear 148, moves the gyro horizon 108 in either direction so that contacts 112 may close the circuit to the motor 64 to either lower or raise the aileron 210. Motion of the aileron produces also a compensating movement for the gyro contacts 112, 114 and 116 by mechanical feed-back through the feed-back lever 170 and rod 184.

Following the circuit, it is seen that for roll axis displacement, the gyro horizon 108 alone effects corrective positioning of the aileron 210 but trimming is effected by the rate of turn indicator 188 which, when actuated due to turning movement of the craft, closes the electrical circuit either between contacts 190 and 194 or 190 and 196, and superimposes its action upon the gyro horizon 108 by means of the mechanical intercoupling as described above.

Operation

In describing the operation of the device reference will be made to the various figures of the drawings which have already been specifically described hereinabove as well as to Figures 6 to 13, inclusive, which, as yet, have not been considered. Figures 6 to 13, inclusive, are purely schematic or diagrammatic in nature and are intended solely to illustrate the relative positions, under various operating conditions, of the aircraft wing, the ailerons, the gyro-horizon including both its housing and the electrical contacts carried thereby and by the gyroscopic element, and the manual control knob. In all of these views, the schematic representation of the aircraft wing is designated by the reference numeral 208 and the left and right ailerons, by the numerals 210 and 212, respectively. The remaining elements illustrated schematically in these views are designated by the same reference numerals as employed in the specification. Figures 6 to 9, inclusive, illustrate in sequence the relative positions of the various parts during operation of the auto-pilot to correct for banking movements of the aircraft in response to gust loads while Figures 10 to 13, inclusive, illustrate a similar sequence of views showing the relative positions of the parts in accomplishing an automatic turn through use of the manual turn control knob 166.

Assuming the airplane to be in a normal condition of straight and level flight under proper trim as represented by the diagram of Figure 6, the autopilot may be placed in operation by moving the lever 88 to its closed position thereby engaging the gear 78 through the clutch element 80 with the control shaft 36. In this position of the parts, if any electrical energy is supplied to the actuator motor 64, the gear 78 will cause the control shaft 36 to rotate. This, in turn, causes rotation of the sprocket wheels 44 and chain 46, and thus, through the control cables 50 and 52, will produce differential aileron movement in the same manner as though the control wheel 42 had been rotated manually.

With the autopilot mechanically engaged, and the electrical circuit closed, let us assume that an external gust due to a thermal current or some other instability of the air through which the airplane is flying causes the latter to move about its longitudinal axis so that the wings assume a banked position to the left as illustrated to an exaggerated extent in Figure 7. Since the gyroscopic element 110 of the gyro-horizon 108 tends to remain relatively fixed in space, and since the housing 106 of the gyro-horizon will move with the aircraft in which it is mounted, such banking of the airplane will cause the contact 112 to engage the contact 116. This causes current to flow from the usual battery 198, to the actuator motor 64 which will rotate the control shaft 36. The latter will move the ailerons 210 and 212 into positions tending to restore the wing 208 to level position. In Figure 7, therefore, the parts are shown in the relative positions they would occupy at the instant the airplane is moved very suddenly into a banked position to the left with the contacts 112 and 116 closed but before the autopilot has had sufficient time to move the ailerons more than a slight amount from neutral position.

Referring again particularly to Figures 1 and 2, as soon as the ailerons 210 and 212 are displaced, the mechanical feed-back intercoupling likewise begins to operate in the direction which tends to restore the electrical contacts 112—116 to neutral position. Thus, as the cable 50—52 move, a proportional movement in a predetermined sense is imparted to the rocker arm 170, the connecting arm 184 tending to cause the segment 128 to rotate. The manual turn control knob 166 is frictionally held against rotation, consequently the shaft 154 and its associated pinion gear 168 cannot turn. It follows that the movement of the lever 170 will likewise be imparted to the segment 126 tending to cause the latter to rotate as a unit with the segment 128.

It will be recalled that the reduction gearing 138—144 between the motor 134 and its drive pinion 148 possesses sufficient friction to be, for all practical purposes, irreversible. Therefore, since the pinion 148 cannot rotate, the motion of the lever 170 will likewise be transmitted to the frame 122 so that the latter will move as a unit with the segments 126 and 128. Finally, since the frame 122 is keyed to the shaft 104, the movement thereof will be imparted to the housing 106 of the gyro-horizon thereby tending to restore the contacts 114 and 116 to neutral position (since they are attached to the housing 106) relative to the gyroscopic element 110 which remains fixed in space and carries the contact 112.

Following the displacement of the aircraft in response to a gust, the closure of the contacts energize the actuator motor 64 to displace the ailerons 210—212 to corrective position proportional to the angle of bank developed by the original gust. The displacement of the ailerons, turns the housing 106 of the gyro-horizon due to the intercoupling above described. Hence, contacts 114 and 116 will be moved toward neutral position relative to contact 112. However, the wing 208 is still displaced from its normal horizontal position and the ailerons 210 and 212 are likewise still displaced to positions tending to correct the condition and to bring the wing back to horizontal. As the wing 208 now starts back to horizontal position in response to control forces exerted by the ailerons, the housing 106 of the gyro-horizon together with its contacts 114 and 116 will be rotated to the right, by the aircraft as it starts to return to level flight, thereby causing the contact 114 to engage with the contact 112. This intermediate position of the parts is illustrated in Figure 8 in which the ailerons 210—212 are displaced to their approximate maximum extent, dependent upon the initial angle of bank, and the contacts 112 and 114 are engaged.

Engagement of the contacts 112 and 114 now reverses the actuator motor 64 thus tending to return the ailerons 210 and 212 to neutral position. Again, however, such reverse movement of the control system is imparted through the feed-back mechanism to the housing 106 and its contacts 114 and 116 thus tending to disengage the contacts 112 and 114. It follows, therefore, that as the wing 208 returns toward horizontal position the extent of displacement of the ailerons 210 and 212 is gradually reduced through successive reverse movements of the actuator motor 64 and reverse follow-up movements imparted to the housing 106. At intermediate positions, as the wing 208 returns toward horizontal position, the parts may assume the positions shown in Figure 9, in which the ailerons 210 and 212 are but slightly displaced from neutral and the contacts actually are in neutral position. As the wing approaches horizontal position, therefore, the displacement of the ailerons 210 and 212 is gradually reduced until the wing reaches its actual horizontal position at which time the displacement of the ailerons has been reduced to zero and, as illustrated in Figure 6, the system is again in equilibrium.

The mechanical intercoupling which positions the gyro-horizon in the direction of the angular displacement which the plane will follow, but prior to such action by the plane, is well termed as "inverse or negative mechanical feed-back." In effect, the successful practical operation of the control system, herein described, is due to a large measure to this feed-back, or follow up feature which prevents overcorrection which in turn would result in oscillation around the roll axis of the plane. It is important to note that as contacts 112 and 114 engage, which gives a corrective effect opposite to the one above described, the feedback coupling similarly develops rotational motion of the gyro housing tending to restore the contacts to neutral position. Hence, the aileron control is not only proportional to the angle of wing displacement but is also damped whereby oscillation is prevented and level flight restored without appreciable overswing from one banked attitude into the other.

In actual practice, under normal flight conditions, the effective damping of the system is such as to eliminate overswing when the plane recovers from roll axis displacement.

A modern airplane is inherently stable about its vertical and transverse axes and if properly trimmed for straight and level flight will tend to maintain a fairly constant heading if some means are provided to hold the wings level. By reason of its construction, however, the conventional gyro-horizon lacks the necessary sensitivity to maintain an airplane in level flight at all times. Thus, even when an airplane is manually controlled by visual reference solely to a gyro-horizon, a "creeping turn" inevitably will develop and it is, therefore, advantageous to superimpose a more sensitive control function upon the system in order to insure the maintenance of a fairly constant heading.

In accordance with the present invention, this relatively sensitive control function to avoid so-called "creeping turns" is accomplished through the use of the rate of turn indicator 138 which is inherently much more sensitive to changes in heading than is the usual gyro-horizon. Changes in heading of the aircraft which are detected by displacements of the rate of turn indicator 188 result in electrical control functions to operate the small trim motor 134 which in turn causes displacement of the electrical contacts 112—116 in such manner as to energize the actuator motor 64 to apply the proper corrective control to the ailerons. In other words, the same actuator motor 64 which is operative to correct for gust loads is also utilized to produce changes in angle of bank of the aircraft in response to change in heading which are too small to be detected by the gyro-horizon but which are of sufficient magnitude to be detected by the rate of turn indicator 188. Corrections to take care of slight changes in heading, therefore, are superimposed upon the basic gust control system as a "trimming" function and in this way no additional servo motors or follow-up instrumentalities are necessary.

Referring particularly to Figures 1, 2 and 4, let us once again assume that the auto-pilot is engaged with all circuits closed for normal operation and the aircraft is properly trimmed for straight and level flight. Now, if a "creeping turn" should develop for any reason, such as an extremely slight banking of the wings in an amount too small to be detected by the gyro-horizon 108, such turn will be detected by the rate of turn indicator 188 with the result that the contact 192 on pointer 190 will engage with one or the other of the contacts 194 or 196. Assuming the contact 192 to be engaged with the contact 194, an electrical circuit will be closed to the trim motor 134 causing the latter to operate in one direction. This will produce rotation of the pinion gear 148 and the inner gear segment 126. Since, in the present case, our original asumption was that the airplane is in straight and level flight, it follows that the feed-back lever 170 can be considered as relatively fixed. It is clearly seen that the physical inter-relation of the parts is such that will cause the frame 122 to move and cause the shaft 104 and the housing 106 to rotate. The electrical contacts 114 or 116 will engage the contact 112, depending upon the direction of rotation, which in turn energize the actuator motor 64 to initiate a control movement terminating at the ailerons.

The operation will be the same as described in connection with the roll axis control. The ailerons will have become displaced to an extent sufficient to correct the slight angle of bank of the wing which was tending to produce the "creeping turn." The action just described, of course, may proceed in either direction depending upon which direction the turn is developing, and the correction will continue to be applied so long as the contact 192 is engaged with either of the contacts 194 or 196. This correction, however, is considerably smaller in magnitude than that required in the case of external gusts. In normal operation, although the trim motor 134 may be continuously in alternate motions, the application of its corrective forces, or the results thereof, are practically imperceptible to the person in the plane.

In order to further improve the utility of the present autopilot, means have also been provided for automatically accomplishing turns in either direction at a substantially constant attitude or angle of bank. This turn control mechanism, again, is superimposed upon the regular control unit and utilizes the same actuator motor 64 to accomplish the desired result.

The operation of the autopilot for automatically effecting a banked turn is initiated by manual rotation of the turn control knob 166 (Figures 1 and 3). In order that the function of the turn control feature may be more clearly understood, Figures 10 to 13, inclusive, illustrate in sequence the relative positions of certain of the parts of the system in much the same manner as has already been described in connection with the roll axis control functioning of the system illustrated in Figures 6 to 9, inclusive.

We shall again assume that the autopilot is in operation and engaged with the control system and that the airplane is properly trimmed for straight and level flight. If now the turn control knob 166 is displaced, as for example to the left as shown in Figure 11, such displacement will effect a similar rotation of the shaft 154 and its associated pinion gear 168. Since the shaft 154 is fixed relative to the segment 126 by means of the block 152, rotation of the pinion gear 168 will cause a relative rotation between the segments 126 and 128. The same physical interlocking exists between the parts, as previously stated, resulting in the rotation of the inner segment 126 about the shaft 104.

Such rotation of the segment 126 will impart an equal rotation to the frame 122 and, as seen before, ultimately to the housing 106 resulting in the actuation of contacts 114 or 116. This is illustrated schematically in Figure 11 which shows the turn control knob 166 rotated to the left thereby rotating the housing 106 relatively to the right and causing the contact 114 carried by the housing to engage the contact 112 carried by the relatively fixed gyroscopic element of the gyro-horizon. The result of engaging the contacts 112 and 114 is exactly the same as has been previously described in connection with operation of the roll axis control system, namely, the actuating of the motor 64 to rotate the control shaft 36 and thereby displace the ailerons 210 and 212. In the present case, however, the ailerons are displaced in such manner as to cause the wing 208 to move to a banked position in order that the aircraft as a whole may begin a turn to the left. The ailerons 210 and 212 are shown thus displaced in Figure 11 and the contacts 112 and 114 are likewise engaged in this view. The wings 208 will now begin to assume a banked position for example as shown in Figure 12. However, as soon as the airplane begins to bank to the left the housing 106 of the gyro-horizon will also turn with the plane thus tending to return the contact 114 out of engagement with the contact 112. Furthermore, during the initial displacement of the ailerons 210 and 212 from neutral position the feed-back mechanism has also been effective tending to move the contacts 112 and 114 out of engagement.

Since the ailerons, as shown in Figure 12, are still displaced from neutral position, a control force is still being applied to the wings tending to increase the angle of bank thereof. As the airplane continues to increase its angle of bank, it arrives at a certain angle as illustrated in Figure 12 when the lower contact 116 will engage the fixed contact 112. Such engagement will reverse the actuator motor 64 and the ailerons will return to neutral position. The wings reach a steady banked attitude at a predetermined angle as shown in Figure 13, at which time the ailerons are in neutral position and the contacts 112–116 out of engagement. The airplane will tend to maintain this banked attitude so long as the turn control knob 166 is held in its displaced position by virtue of the fact that the housing 106 of the gyro-horizon has been displaced to give a new equilibrium position to the contacts 114 and 116. While the airplane is in the banked position as illustrated in Figure 13, the autopilot will continue to operate in the manner already described, and if an unbalanced gust should act upon the wings tending either to increase or decrease the selected angle of bank, the appropriate contact 114 or 116 will be closed with the contact 112 and a sequence of operations will ensue tending to restore the wings to their original banked attitude. In like manner any necessary reverse aileron to counteract the usual inherent overbanking tendency of most airplanes will be held automatically by the control unit.

While the airplane is in the banked attitude as illustrated in Figure 13, it will, of course, be making a turn to the left, and this turn, or change in heading, would be sensed by the rate of turn indicator 188 causing one or the other of its contacts to be engaged with the movable contact 192. Thus, if the rate of turn indicator were permitted to energize the trim motor 134 under such conditions, the control unit would be actuated in a direction tending to reduce the angle of bank of the wings to restore the airplane to straight and level flight. In order to prevent this now undesired action, a switch 206 (Figure 14) is provided in the circuit to the trim motor 134. This may be mechanically connected to the turn control knob 166 so that whenever the latter is displaced from neutral position either to the right or left the switch 206 will be automatically operated to break the circuit to the trim motor 134. Thus, when the turn control knob 166 is operated in either direction the trim motor 134 is deenergized so that the frame 122 and inner gear segment 126 move together as an integral unit.

Upon completion of the desired turn, or upon reaching the desired heading, the turn control knob 166 is simply returned to neutral position, whereby initiating an exactly opposite actuation of the entire system. It will become apparent that the angle of bank, when utilizing the automatic turn feature, is equal to the angular displacement of casing 106 of the gyro-horizon. This is a predetermined angle and depends upon the extent of rotation of the control knob 166. In practice, this knob may be provided with more than one position for selected banking angles. The successful operation of this system in negotiating turns automatically is particularly enhanced when the ailerons and the rudder of the craft are mechanically interlinked so that a coordinated turn is made without adverse yaw effect.

Although I have shown and described the present invention as applied to a conventional airplane, it is obvious that the principles of the invention are equally adaptable to the control of any body capable of movement through space and subject to aerodynamic forces for the maintenance of its flight path. Furthermore, while I have described the autopilot as connected to a conventional aileron system, it will be clear that the invention is not so limited and in modified form, without departing from the scope thereof, may be applied to guided missiles or similar devices.

I claim:

1. In an aircraft having differentially movable ailerons for controlling motion about its roll axis and a control system connected to said ailerons for moving the latter, means for actuating said ailerons, including an electric motor having releasable driving engagement with said system, and control unit for said motor comprising a base mounted in said aircraft and having an upwardly extending bracket provided with a generally horizontal bearing thereon, a gyro-horizon having a shaft secured to its housing at one end and journalled in said bearing, said shaft extending beyond said bearing and having a frame member secured thereto, first and second gear segments rotatably mounted on said shaft beyond said frame member, an electric trim motor mounted in said frame and having its driving pinion in engagement with said first segment, a block secured to said first segment and providing a bearing therein, a flexible shaft journalled in said housing and said block, a pinion gear fixed to one end of said flexible shaft and in engagement with said second segment, a manual control knob mounted on the other end of said flexible shaft, a lever pivotally mounted in said aircraft and yieldingly connected at its opposite ends in follow-up relationship to said system, means connecting one end of said lever to said second segment for transmitting follow-up movement from said system to said unit, a gyroscopic rate-of-turn indicator, first electrical contacts carried by the gyroscopic element and the housing respectively of said gyro-horizon and reversely operable upon relative movement of the latter from neutral position to transmit power to said first mentioned motor, and second electrical contacts carried by the gyroscopic element and the case respectively of said rate of turn indicator and reversely operable upon relative movement of the latter to control actuation of said trim motor.

2. In an aircraft having differentially movable ailerons for controlling motion about its roll axis and a control system connected to said ailerons for moving the latter, means for actuating said ailerons including an electric motor having releasable driving engagement with said system, and a control unit for said motor comprising a gyro-horizon having its housing mounted in said aircraft for rotation about a generally horizontal axis, a shaft secured axially to said housing for rotation therewith and having a frame rigidly secured thereto, first and second gear segments rotatably mounted on said shaft, an electric trim motor mounted in said frame and having its driving pinion in engagement with said first segment, bearing means adjacent the periphery of said first segment, a flexible shaft journalled in said housing and said bearing means, a pinion gear fixed to one end of said flexible shaft and in engagement with said second segment, a manual control knob mounted on the other end of said flexible shaft, a lever pivotally mounted in said aircraft and yieldingly connected in follow-up relationship to said system, means connecting said lever to said second segment for transmitting follow-up movement from said system to said unit, a gyroscopic rate-of-turn indicator mounted in said aircraft, first electrical contacts carried by the gyroscopic element and the housing respectively of said gyro-horizon and reversely operable upon relative movement of the latter from neutral position to transmit current to said first mentioned motor, and second electrical contacts carried by the gyroscopic element and the case respectively of said rate-of-turn indicator and reversely operable upon relative movement of the latter to transmit current to said trim motor.

3. In an aircraft having differentially movable ailerons for controlling motion about its roll axis and a control system connected to said ailerons for moving the latter, means for actuating said ailerons including an electric motor having releasable driving engagement with said system, and a control unit for said motor comprising a gyrohorizon having its housing mounted in said aircraft for rotation about a generally horizontal axis, a shaft secured axially to said housing for rotation therewith, first and second gear segments rotatably mounted on said shaft, an electric trim motor secured to said shaft and having its driving pinion in engagement with said first segment, bearing means adjacent the periphery of said first segment, a flexible manual control shaft journalled in said bearing means having a pinion gear fixed to one end thereof and in engagement with said second segment, a lever pivotally mounted in said aircraft and yieldingly connected in follow-up relationship to said system, means connecting said lever to said second segment for transmitting follow-up movement from said system to said unit, a gyroscopic rate-of-turn indicator mounted in said aircraft, first electrical contacts carried by the gyroscopic element and the housing respectively of said gyrohorizon and reversely operable upon relative movement of the latter from neutral position to transmit current to said first mentioned motor, and second electrical contacts carried by the gyroscopic element and the case respectively of said rate-of-turn indicator and reversely operable upon relative movement of the latter to transmit current to said trim motor.

4. In an automatic flight control system for aircraft having wing elements positionable for roll axis displacement of the craft, control means for positioning said elements, a roll axis displacement sensing device operatively responsive to the magnitude and direction of said displacement, means responsive to the operation of said device for actuating said control means in the direction for corrective positioning of said elements, thereby to counteract said displacement, follow-up means for altering the effective operative response of said sensing device simultaneously with the actuation of said control means, whereby oscillation about said roll axis is substantially prevented; a yaw axis displacement rate sensing device for sensing turning movement of the craft, including movements too small to be detected by said roll axis displacment sensing device, control means responsive to the sensing operation of said displacement rate sensing device and means for superimposing the operation of said last mentioned control means upon the operation of said roll axis displacement sensing device response means, whereby trimming of the corrective positioning of said elements is automatically effected.

5. In an automatic flight control system for aircraft having wing elements positionable for roll axis displacement of the craft, a source of electrical energy, electromotive means for positioning said elements, a gyro horizon responsive to the magnitude and direction of said displacement, bi-directionally movable switching means, means for actuating said switching means upon response of said gyro into contact position for energizing said electromotive means from said source for positioning said elements and thereby counteracting said displacement, and follow-up means for effecting movement of said switching means in the direction opposite from said contact position simultaneously with the actuation of said electromotive means whereby oscillation about the roll axis is substantially prevented; a yaw axis displacement sensing gyro, bi-directional switching means operable thereby, electromotive means controlled from said last mentioned switching means for effecting rotation of said first switching means upon actuation of said last mentioned electromotive means, thereby energizing said first electromotive means for positioning said elements and effecting automatically the trimming of the corrective positions of said elements, and manual means for displacing said first switching means to a predetermined extent thereby effecting banking of said craft at a fixed angle.

6. In an automatic flight control system for aircraft having wing elements positionable for roll axis displacement of the craft, a source of electrical energy, electromotive means for positioning said elements, a gyro horizon responsive to the magnitude and direction of said displacement, bi-directionally movable switching means, means for actuating said switching means upon response of said gyro into contact position for energizing said electromotive means from said source for positioning said elements and thereby counteracting said displacement, and follow-up means for effecting movement of said switching means in the direction opposite from said contact position simultaneously with the actuation of said electromotive means whereby oscillation about the roll axis is substantially prevented; a yaw axis displacement sensing gyro, bi-directional switching means operable thereby, electromotive means controlled from said last mentioned switching means for effecting rotation of said first switching means upon actuation of said last mentioned electromotive means, thereby energizing said first electromotive means for positioning said elements and effecting automatically the trimming of the positions of said elements.

References Cited in the file of this patent

UNITED STATES PATENTS

| 1,725,600 | Sperry | Aug. 20, 1929 |
| 2,268,561 | Meredith | June 16, 1942 |
| 2,307,941 | Meredith | Jan. 12, 1943 |
| 2,351,977 | Kronenberger et al. | June 20, 1944 |
| 2,413,739 | White | Jan. 7, 1947 |
| 2,443,748 | Sanders et al. | June 22, 1948 |
| 2,498,223 | Rommel | Feb. 21, 1950 |
| 2,558,096 | Markusen | June 26, 1951 |
| 2,589,834 | MacCallum | Mar. 18, 1952 |